United States Patent [19]

Blake et al.

[11] Patent Number: 4,635,277

[45] Date of Patent: Jan. 6, 1987

[54] DIGITAL CLOCK RECOVERY CIRCUIT APPARATUS

[75] Inventors: John K. Blake; Blaine J. Nelson, both of Plano, Tex.

[73] Assignee: Rockwell International Corporation, El Segundo, Calif.

[21] Appl. No.: 789,541

[22] Filed: Oct. 21, 1985

[51] Int. Cl.[4] .............................................. H03K 5/19
[52] U.S. Cl. ........................................ 375/20; 375/95; 375/119; 328/109; 329/104
[58] Field of Search .................. 375/20, 95, 106, 118, 375/119; 328/108, 109, 110, 118, 119; 329/104; 307/511, 354; 360/44, 51

[56] References Cited

U.S. PATENT DOCUMENTS

| | | | |
|---|---|---|---|
| 4,412,339 | 10/1983 | Alfke et al. | 375/95 |
| 4,571,514 | 2/1986 | Nelson et al. | 329/106 |
| 4,571,735 | 2/1986 | Furse | 375/20 |

Primary Examiner—Benedict V. Safourek
Attorney, Agent, or Firm—Bruce C. Lutz; V. L. Sewell; H. Fredrick Hamann

[57] ABSTRACT

A digital circuit which ascertains the middle of a digital pulse by first determining its total length through digital logic means in combination with a digital signal delay means, and uses this information to operate a state machine (or sequencer), which will assume that data clocks occur at the time of the last received valid data pulse until new logic "1" data is received, and at this time can be resynchronized or phase-locked if there is a time discrepancy between recently received data and the status of the state machine.

5 Claims, 14 Drawing Figures

R7 — RESET RS7 IF DC = 1
R9 — RESET RS9 IF DC = 1
S7 — SET RS7 IF DCN = 1
S9 — SET RS9 IF DCN = 1

DIGITAL CLOCK RECOVERY CIRCUIT APPARATUS

THE INVENTION

The present invention is generally concerned with electronics and more specifically with a clock recovery circuit. Even more specifically, it is concerned with a digital version of a clock recovery circuit comprising a detection circuit for detecting the length of a pulse in combination with a nonlinear digital phase-locked loop.

PRIOR ART

A typical prior art approach to detecting the appropriate time to generate a clock signal in response to received data, which is of the type that is noncontinuous, was to use a resonant (ringing tank) clock circuit. However, the ringing tank required a minimum repetition rate of data pulses being received to keep the clock circuit in a "ringing" condition. Further, these circuits were subject to temperature variations, and accordingly to drift in frequency of operation. Also these circuits required a considerable amount of testing and adjusting at the factory and later in the field to keep the devices tuned to the appropriate frequencies. As the signals received become more and more distorted, there is more and more possibility of error in the time of generation of the clock signal. For accurate information recovery, the clock signals must occur at a prescribed time with respect to data being detected.

By using a high frequency crystal as a stable reference and sampling the data at a comparatively high rate, the length and position in time of the incoming data pulse can be accurately determined and thus, through decoding logic, the approximate center of the received pulse can be ascertained. A phase-locked loop circuit can then be operated at the high frequency clock rate to generate a new output signal representative of the data pulse, of the exact design length and having a clock situated at the optimal time with respect to the data pulse.

It is thus an object of the present invention to provide an improved clock recovery circuit for return-to-zero data.

Other objects and advantages will be apparent from a reading of the specification and appended claims in conjunction with the drawings wherein:

Figure 1:
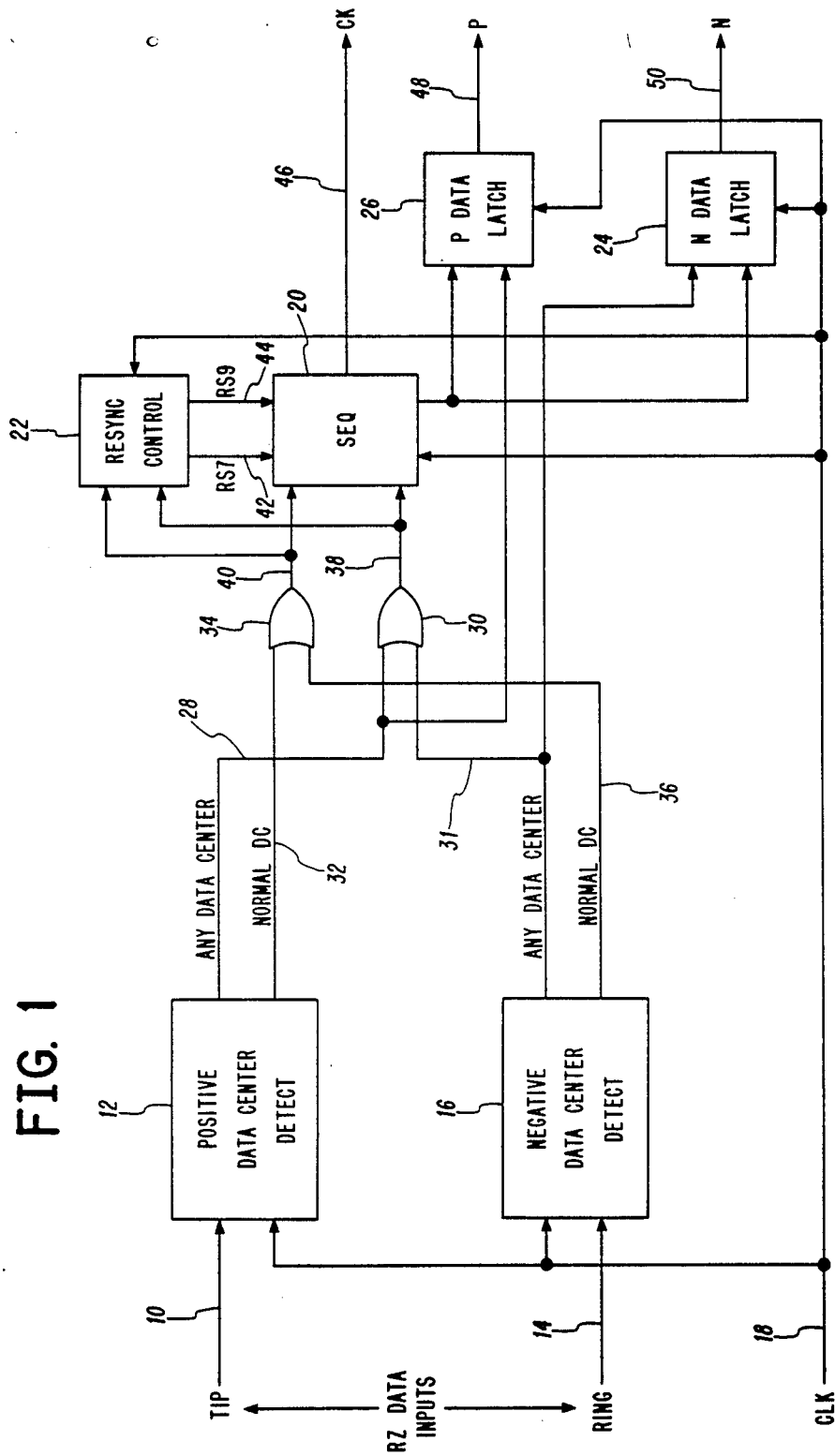
FIG. 1 is a block diagram of the overall inventive concept.
Figure 3:
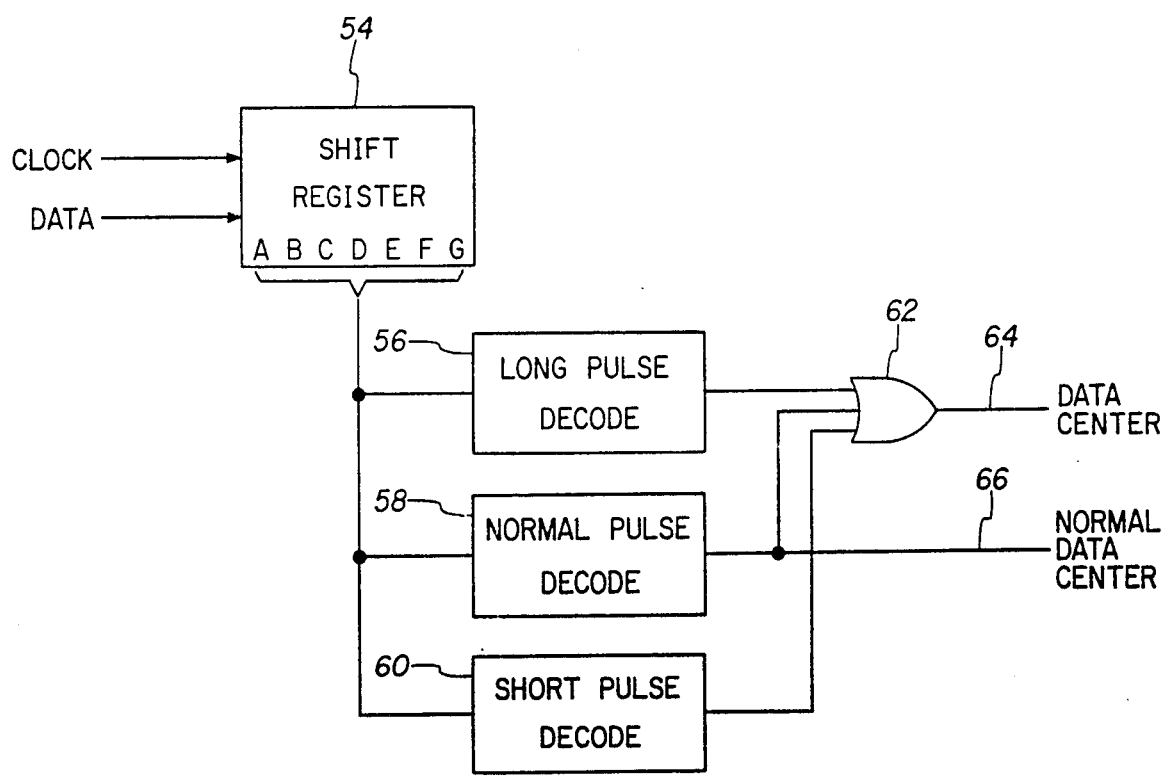
FIG. 3 is a block diagram of a portion of FIG. 1.
Figure 14:
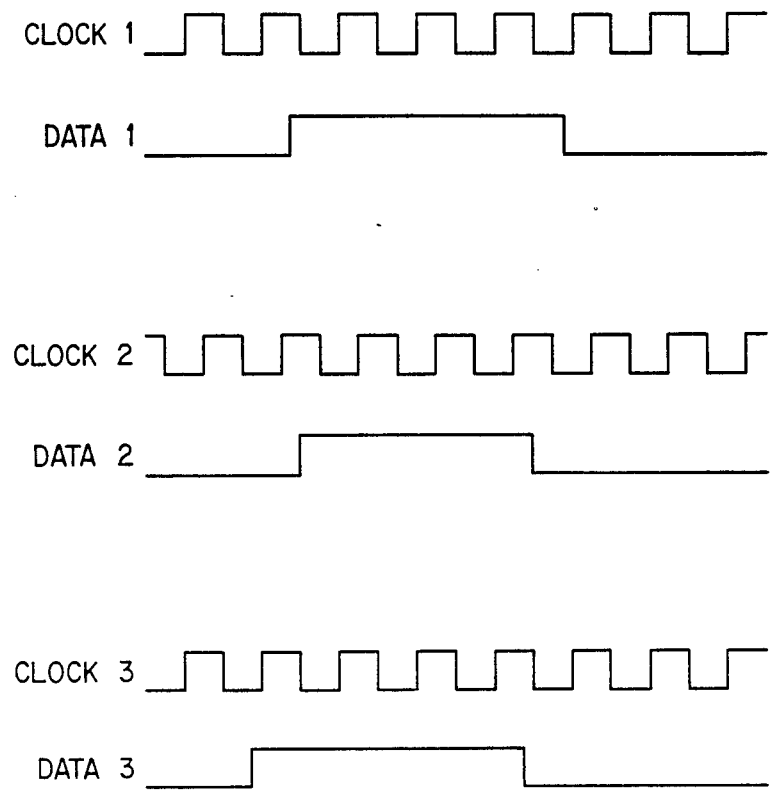

FIG. 14 comprises a set of waveforms used in explaining the operation of FIGS. 1 and 3.

DETAILED DESCRIPTION

In FIG. 1, a lead 10, which is also labeled TIP, supplies signals to a positive data center detect block 12. A RING lead 14 supplies signals to a negative data center detect block 16. The leads 10 and 14 comprise the return-to-zero data inputs. In addition, a clock signal is supplied on a lead 18 to both the blocks 12 and 16 as well as to a sequencer block 20, a resynchronization block 22, a negative data latch 24 and a positive data latch 26. Signals indicative of a detection of the data center are output from block 12 on a lead 28 to an OR gate 30 which receives similar signals from a lead 31 output by block 16. The lead 28 is also connected to supply signals to the positive data latch 26. In a similar manner, lead 31 is also connected to negative data latch 24. Signals indicative of receipt of a normal length data center are output on a lead 32 from positive data center block 12 to an OR gate 34. Similar signals are output on a lead 36 from negative data center detect block 16 to another input of OR gate 34. The output signals of OR gate 30 are supplied on a lead 38 both to sequencer 20 and to resynchronization circuit 22. Output signals from OR gate 34 are supplied on a lead 40 to sequencer 20 as well as to resynchronization circuit 22. The resynchronization circuit 22 has leads 42 and 44 for indicating to sequencer 20 to operate on a divide-by-seven or divide-by-nine basis, respectively. The sequencer 20 also supplies output clock signals on a lead 46. Positive data signals are supplied on a lead 48 from latch 26, while negative data signals are supplied on lead 50 from negative data latch block 24.

Figure 2:
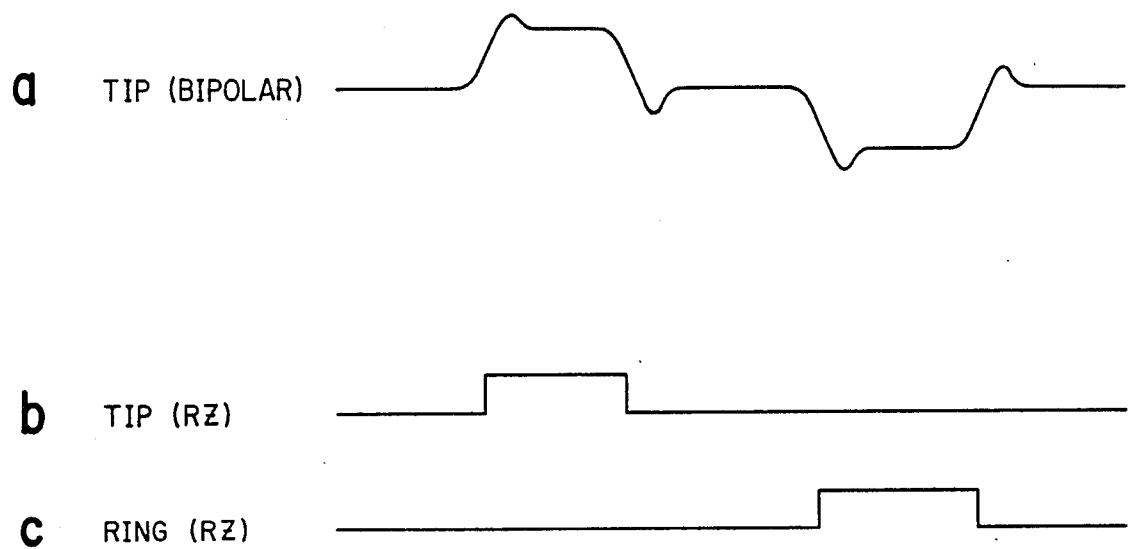
FIG. 2 is a set of waveforms used in explaining the operation of FIG. 1.

The waveform in FIG. 2a illustrates a bipolar tip-ring signal as carried on a typical telephone line.

The waveform in 2b illustrates the unipolar return-to-zero signal indicative of when 2a is positive relative a ground reference. The waveform 2c indicates when the signal of 2a is negative.

FIG. 3 illustrates the circuitry within either of the data center detect blocks 12 and 16. In each case there is a shift register 54 which supplies a plurality of outputs labeled A through G to each of a set of decode blocks 56, 58 and 60. These blocks are labeled, respectively, long pulse decode, normal pulse decode and short pulse decode. The output of each of these blocks is supplied to an OR gate 62, which provides output signals on a lead 64 which would be comparable to leads 28 or 31 of FIG. 1. In addition, the output from block 58 is supplied on a lead 66 as an indication of a normal data center, and this would be similar to the signals appearing on leads 32 or 36 of FIG. 1. As illustrated, the shift register 54 comprises seven portions so that it can, at any given time, output seven contiguous bits of sampled data, but more samples could be obtained using a higher clock frequency for some applications.

Figure 4:
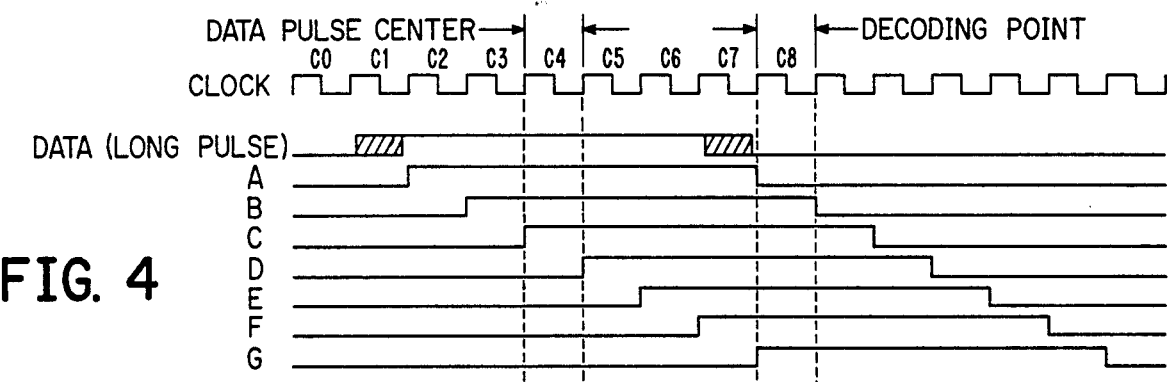
FIGS. 4 through 9 are waveforms used in explaining the operation of the invention.

In FIG. 4, a waveform labeled CLOCK is illustrated which operates at eight times the frequency of the data pulse repetition rate. Thus, during the duration of a normal length data pulse, the data pulse can be sampled in the logic "1" condition either three or four times. The system is set up so that the delayed center of the incoming data pulse is phase locked to cycle C4 while the decoding point for the data center output occurs in cycle C8.

The waveform labeled data in FIG. 4 is shown commencing just after the commencement of cycle C1 with a shaded portion extending to just prior to the end of cycle C1. The data pulse is shown as ending during cycle C7. The shaded portions are used to illustrate the possible variation in time of the actual received data pulse, while still producing the same length unipolar signal to be decoded as shown by waveforms A through G in FIG. 4. FIG. 4 illustrates a condition where the value of the signal in waveform A is a logic "0", but the remaining waveforms B through F are in a logic "1" condition and waveform G is a logic "0".

Figure 5:
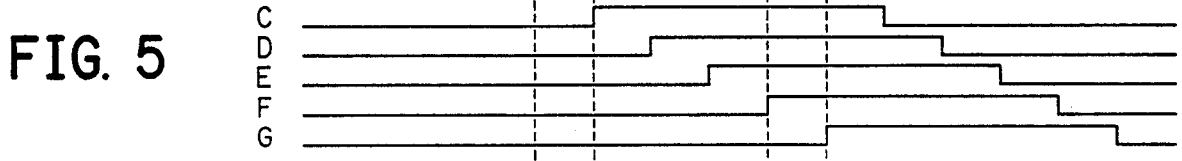

FIG. 5 is a further illustration of a slightly narrower data pulse than that shown in FIG. 4. This data pulse commences during cycle C2 and ends during cycle C7. Shaded portions are used for the same reasons as in FIG. 4. During the decoding cycle C8 all the waveforms of FIG. 5 provide a logic "1" except those of waveforms A and G.

Figure 6:
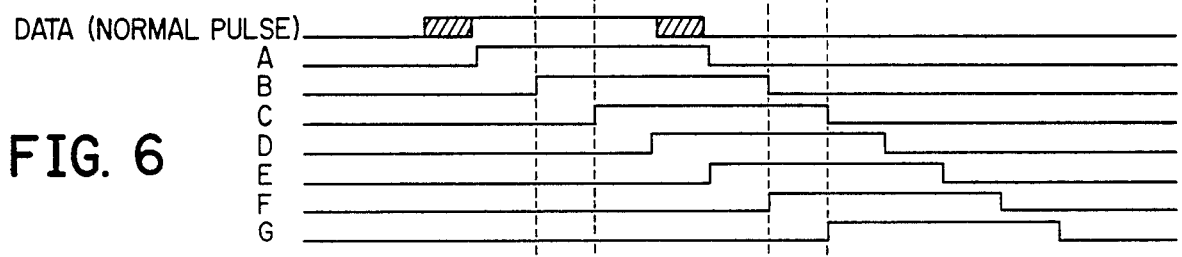
Figure 7:
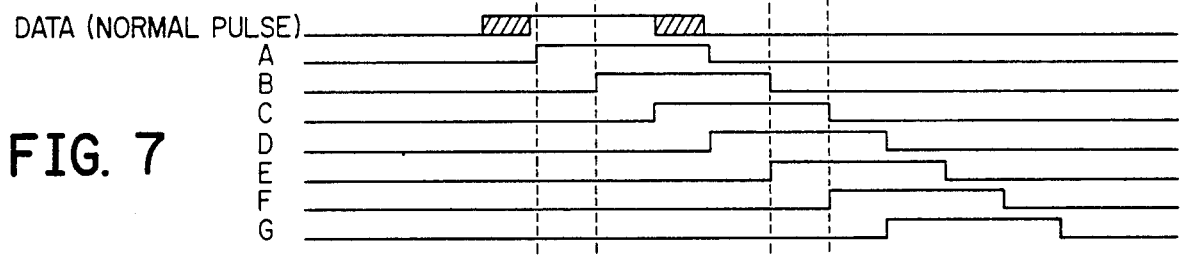

FIG. 5, FIG. 6 and FIG. 7 together show the three possibilities for sampling of a normal length pulse. A normal pulse is defined as being more than three sampling periods, shown in FIG. 7, and less than six full sampling periods, as shown in FIG. 5.

Figure 8:
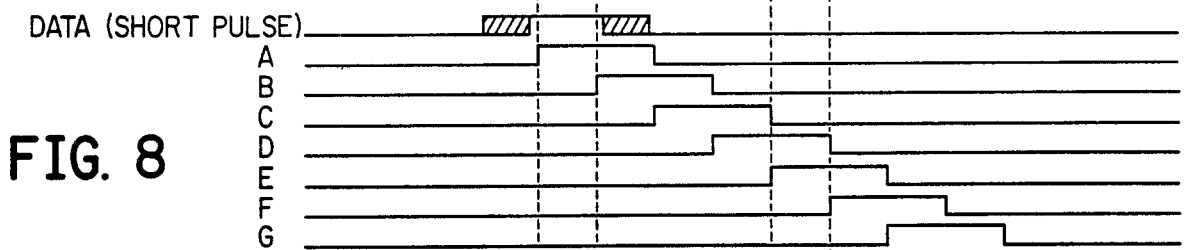
Figure 9:
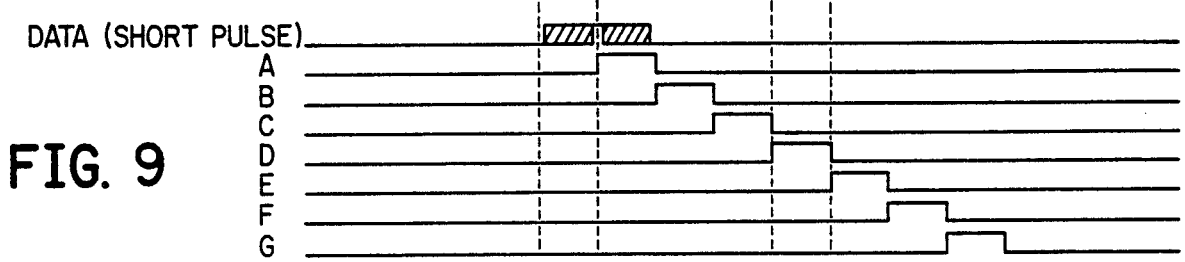

FIGS. 8 and 9 show the two possibilities for sampling of a short length pulse. A short pulse is defined as greater than one sampling period and less than three full sampling periods, examples of which are shown in FIGS. 8 and 7, respectively.

Figure 10:
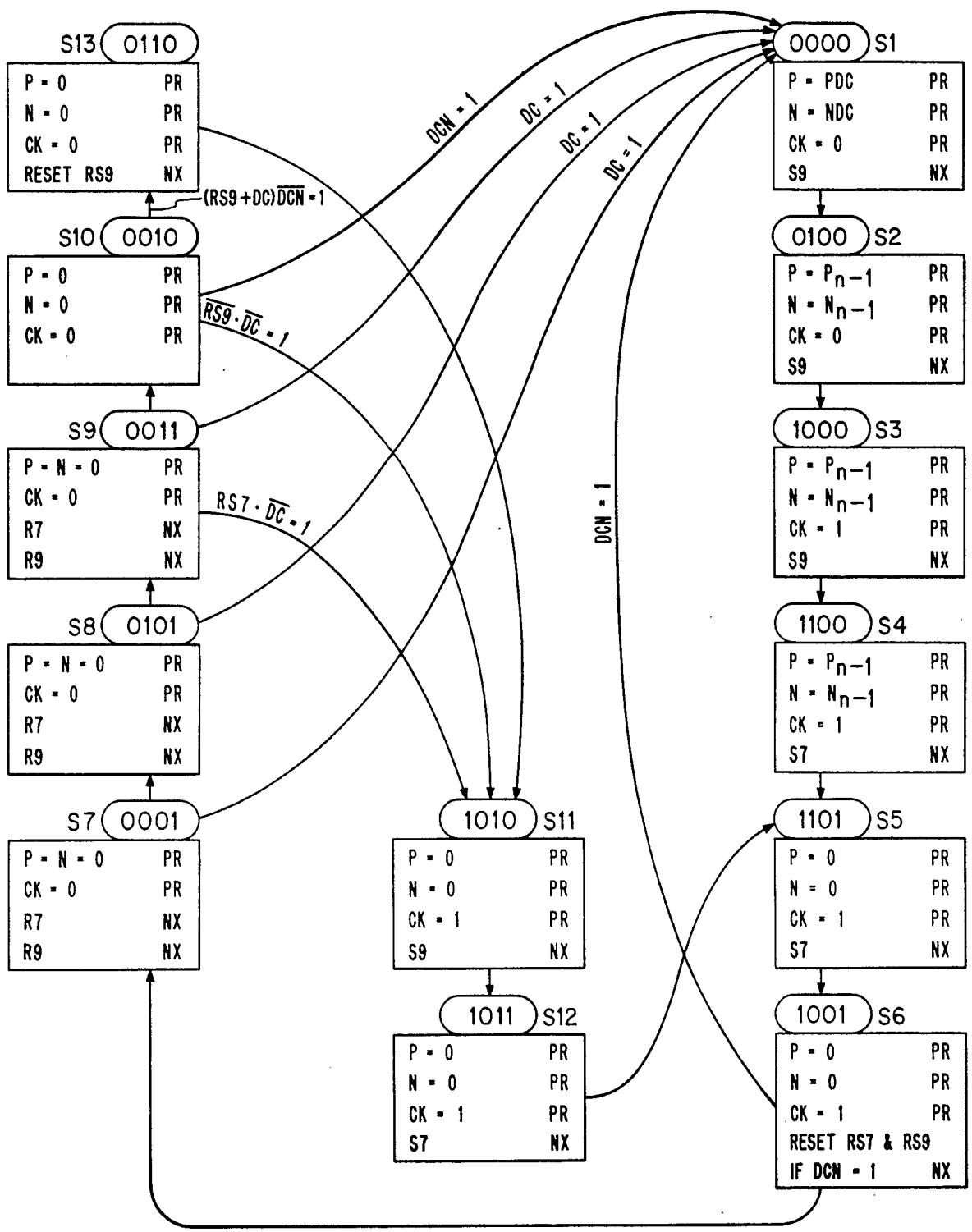
FIG. 10 is a diagram used in explaining the operation of the sequencer.

In FIG. 10, thirteen states are shown for the possible digital outputs of the sequencer 20 of FIG. 1. The output of the sequencer is shown within each one of the states S1 through S13. In other words, in state S3 the first digit or the A digit (as presented in FIG. 13) is a logic "1" while the remaining digits B through D are logic "0". Similarly, in state S9 the A and B digits are logic "0" and the C and D digits are logic "1's". In each case, the A digit is also used as the clock signal 46 in FIG. 1, and thus the output clock is a logic "1" in states S3 through S6 and states S11 and S12. The decoding circuitry within sequencer 20 determines the path and thus to which state an advance is made in the next clock cycle. The subsequent state advancement is dependent upon various signal inputs including the existence of normal data pulses, and time of receipt of these pulses relative to decoding clock C8 of FIGS. 4-9. For example, if the sequencer is in state S8 and the data center input (DC) to the sequencer is a logic "1", then the path from S8 to S1 would be followed. Otherwise, with the the data center input DC="0", the path from S8 to S9 would be taken.

Adjacent each of the states S1 and S13 a legend is provided. The signals P, N, CK are outputs of the circuit and are applied to leads 48, 50 and 46 of FIG. 1, respectively. The signals labeled Pn−1 and Nn−1, listed in the state blocks of FIG. 10, are the values of P and N in the previous state. The signals RS7 and RS9 are the outputs of internal memory devices that hold the resync mode (the path or steps to be taken if resynchronization is required) of the sequencer until acted upon. The PR label indicates that the output that it is paired with has the value given in the accompanying equation during that state. For example, in state S2 the output P has the value Pn−1 that it had at the end of state S1 (the previous state) from the beginning of S2 to the end of S2. Also, in S2 the output CK has the logical value "0". The NX label indicates that the signal with which it is paired having has the value assigned by the logic statement on entering the next state. For example, in S7 if the value of data center (DC) during this state is DC="1", then at the beginning of the next state (S1 in this case) the logical value of the signal RS7 is reset (RS7=0) and the logical value of the signal RS9 is reset (RS9=0). The term "Reset" indicates a logic value "0", while "Set" indicates the logic value "1".

When normal length data centers are being received, the typical path is S8, S1, S2, S3, S4, S5, S6, S7 and back to S8. If there is jitter or variations in the time of occurrence of the data centers, the data center input to the sequence can occur in states S6, S7, S8, S9, S10. If the data center occurs in one of these states, the exit path to S1 will be taken to return the data center to the time of occurrence of state S8. In other words, there is a dynamic adjustment during the time of receipt of logic "1's" in a phase-locked loop manner. When the data center logic "1's" are not received, the normal path is S8, S9, S10, S11, S12, S5, S6, S7 and back to S8. When normal data centers are received at a time outside the S6 through S10 states, the state sequence is adjusted by either shortening the sequence to seven states by branching from state S9 to state S11 or extending the sequence to 9 states by branching from state S13 to state S11 to return the received normal data centers to the time of occurrence associated with state S8. The above brief explanation will be more apparent from later information.

Figure 11:
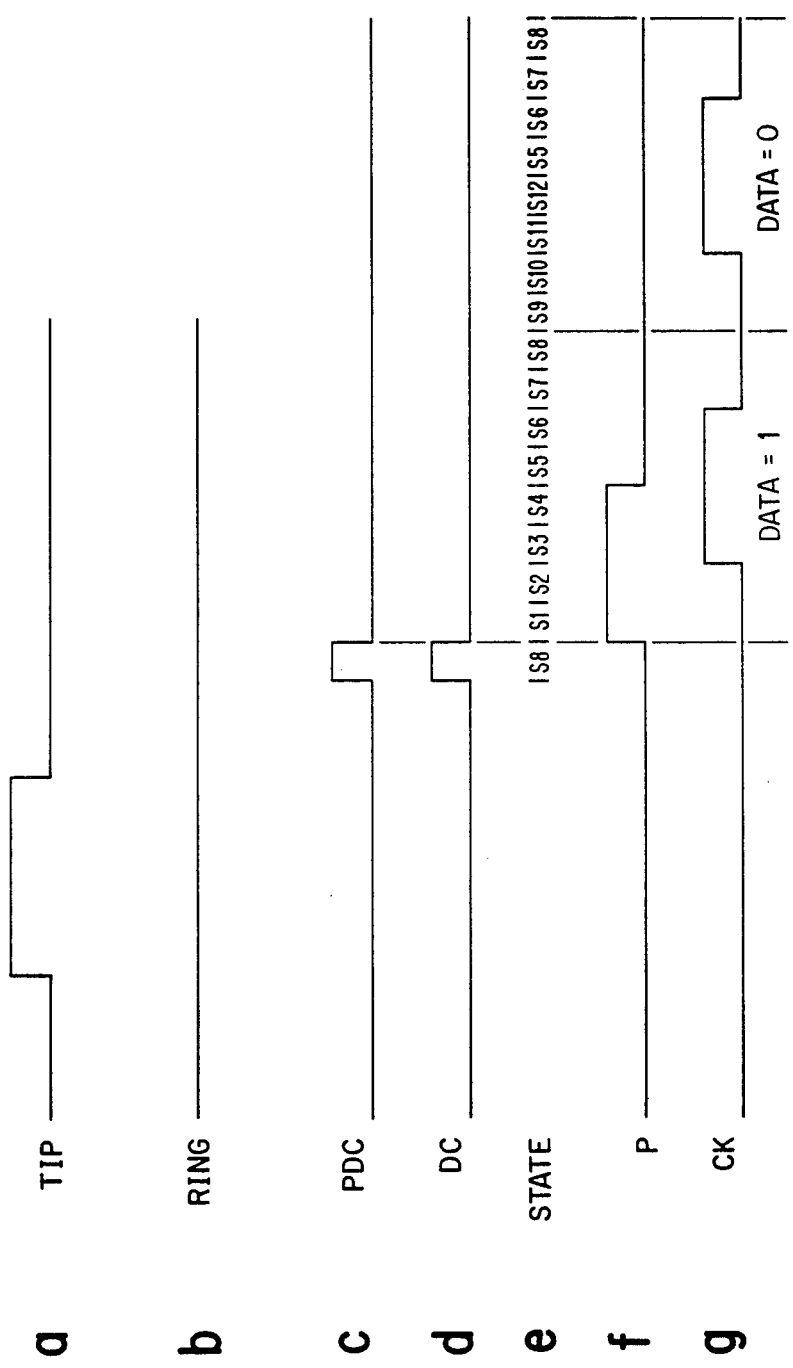
FIG. 11 is a set of waveforms used in explaining the operation of the sequencer.

In FIG. 11, waveforms A and B represent respectively the tip and ring (RZ) signals. Waveform C illustrates the signal appearing on a lead indicating the receipt of a positive data center as opposed to a negative data center, while the waveform D represents the signal appearing on a data center lead such as 28 in FIG. 1. If the signal of waveform A was received, the sequencer 20 would follow that sequence shown in the state sequence of FIG. 11e from states S1 through S8. An output, such as on lead 48 of FIG. 1, would appear as shown in waveform F commencing at the start of state S1 and ending at the end of state S4. A clock signal illustrated in waveform G of FIG. 11 would be similarly output on lead 46 of FIG. 1. As will be noted, the clock signal of waveform G commences at the start of state S3 and continues to the end of state S6. On the following sequence or cycle through the sequencer 20, no data center is detected and thus there is no logic "1" output in waveform F, however, the clock signal of waveform G again occurs commencing at state 11 of the presentation in line E of FIG. 11. The second sequence from S9 through S12 and then S5 to S8 is repeated as long as no further data centers are detected.

Figure 12:
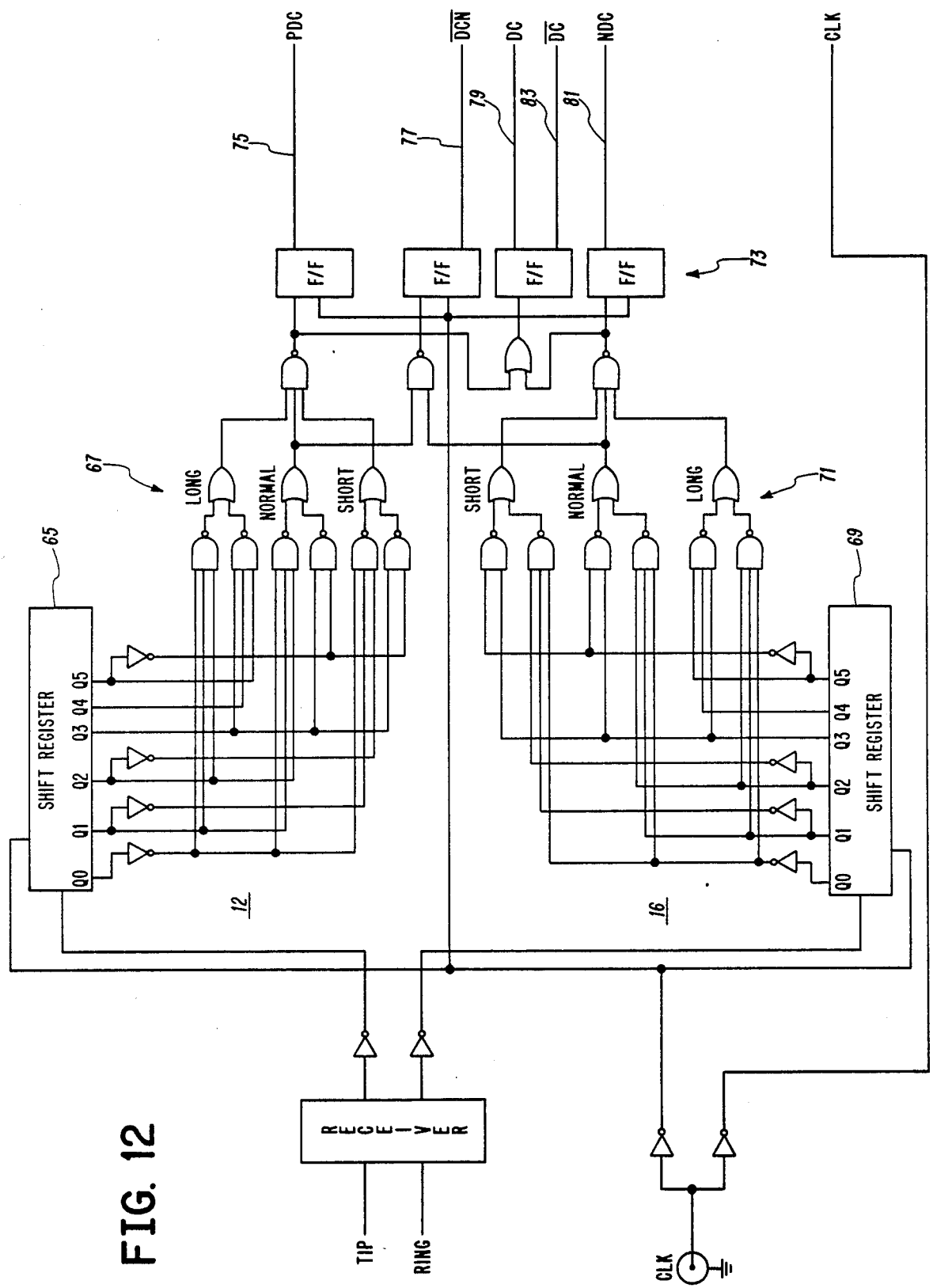
FIG. 12 is a detailed schematic diagram of a portion of FIG. 1.

FIG. 12 shows a detailed six tap schematic diagram which allows slightly more errors in detection than would be associated with the seven tap scheme shown in the other drawings. The addition to this drawing for seven taps would be obvious to one skilled in the art. The inclusion herein of the additional gates necessary to show a seven tap schematic would merely clutter up the drawing and make it harder to understand the detailed concept.

Referring to FIG. 12, it will be noted that the upper portion illustrates the positive data center detect block 12 of FIG. 1 and comprises a shift register 65 and a plurality of NAND and OR gates, generally designated as 67. The lower portion of FIG. 12 illustrates the block 16 and comprises a shift register 69 and a plurality of NAND and OR gates 71. The outputs of the sets of gates 67 and 71 are logically combined in a set of D flip-flops, generally designated as 73, which provide the outputs of positive data center on lead 75, inverse normal data center ($\overline{DCN}$) on lead 77, a data center of any type on lead 79 and a negative data center on lead 81. A further inverse data center ($\overline{DC}$) is illustrated as being supplied on lead 83.

Figure 13:
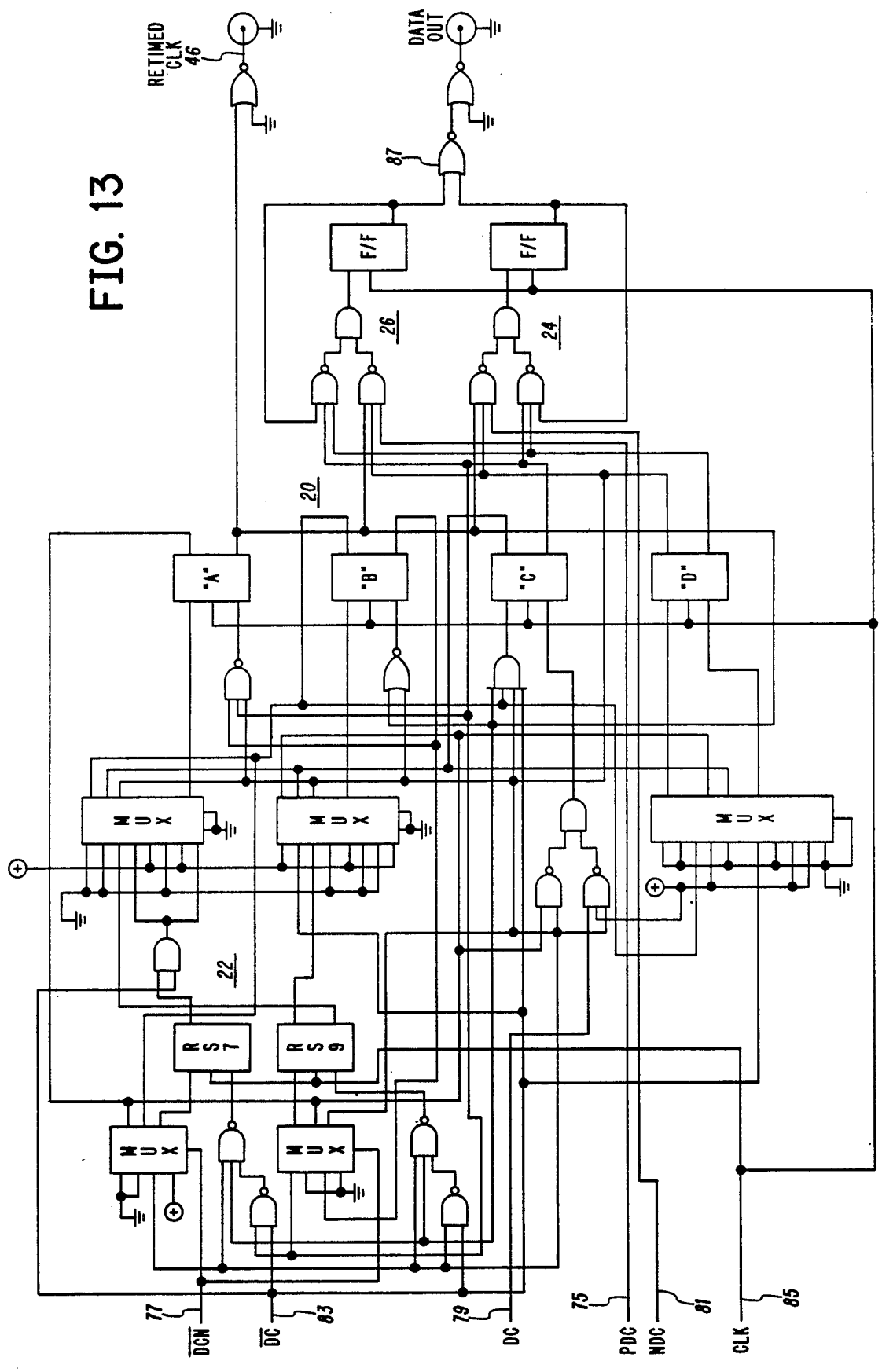
FIG. 13 is a detailed schematic diagram of another portion of FIG. 1.

FIG. 13 has a set of input leads using the same designations as those output by FIG. 12 and includes in addition a clock 85. The upper left hand portion of FIG. 13 comprises the resynchronizing portion designated as 22 in FIG. 1, while a majority of the remainder including the JK flip-flops comprises the sequencer 20. The right hand portion coaprises the positive data and negative data latches 24 and 26 with the signals being combined in a NOR gate 87 and combined for output as return-to-zero data. The retimed clock output is given the same designation as in FIG. 1.

FIG. 14 comprises three sets of clock and data signals. These three sets are used to illustrate the movement of the data pulse with respect to the clock pulse. Such a movement of the data pulse with respect to the clock pulse would normally take place over a long period of time. Thus, the illustrations are shown as separate instances in FIG. 14 with each data pulse being illustrated with respect to a corresponding portion of the clock stream. Further, the data pulse widths are presented as being different to illustrate that the data pulse is not always the same duration. As illustrated, the data is lagging the rising edge of the clock pulse for data 1 and is leading by a lesser amount at the time indicated for data 2 while the data leads the clock pulse in the instance shown for data 3.

OPERATION

The present invention was designed specifically to work with telephonetype signals wherein the tip or ring signals are pulses which nominally are 320 nanoseconds in length and are separated in logic data bit values by 320 nanoseconds. This would be the normal length pulse as shown in FIGS. 5, 6 or 7, as well as FIG. 2. The sampling clock used in one embodiment of the invention thus operated at 12.352 MHz and for the nominal length pulse provided four samples of the signal itself and four samples of the separation time. This is illustrated in FIG. 11, waveforms E through G. Modifications to allow operation at other frequencies will be apparent to those skilled in the art.

As previously indicated, the purpose of the present invention is to generate (or recover) a clock signal which would occur at a time such that it could be used in timing other circuitry from an incoming signal which did not contain the clock, and which at times did not have any logic "1" excursions of the incoming signal. The absence of logic "1" excursions of the amplitude of the incoming signal of the prior art tended to allow the ringing tank circuits used in the prior art to drift substantially in clock frequency from the desired frequency and to thus make errors in the detection of incoming data.

Reference will first be made to FIG. 3 in combination with explanatory FIGS. 4 through 9.

FIG. 3 shows a block diagram of the data center detection circuit. The purpose of this circuit is to generate signals that: (1) indicate the approximate center of an incoming data pulse, and, (2) indicate the type or length of that data pulse. The length of the incoming signal is determined by the number of cycles of the clock signal, shown in FIG. 3, which occur during the presence of an incoming data pulse. This purpose is complicated by the fact that the time of the beginning of the clock signal and the beginning of the data signal have no set or predetermined relationship. This is shown in FIG. 14.

A further practical restriction requires that for data to be entered into the shift register, it must be a defined logic level for a specified minimum amount of time before the beginning of a clock cycle.

The center of a data pulse is determined by allowing the incoming data pulse to be sampled, or entered, into the shift register until the end of the data pulse is detected. By doing so, the time of occurrence of the beginning and end of the pulse is known and the center can therefore be determined.

In this particular implementation, the clock signal operates at eight times the given nominal frequency of the incoming signal. This implies that the normal data pulse width is four clock cycles in length.

FIG. 6 shows an incoming data pulse of exactly four clock cycles in length. The Figure also indicates that the data pulse has reached a logic "1" value before the beginning of clock cycle S2 and has reached a logic "0" value before the beginning of clock cycle S7. Four clock cycles have occurred during the presence of the data pulse and each of the signals A-G are logic "1's" for four clock cycles. The center of this incoming data pulse is during S4. It should be noted that any pulse which begins during S2 cycle and ends during S7 is interpreted in the above manner, although the pulse just described could be only slightly larger than three clock cycles or slightly less than five full clock cycles. This is decoded at the output of the shift register during S8 as being a normal length pulse.

FIG. 5 shows an input pulse whose length is only slightly larger than four clock cycles but less than six full clock cycles, and FIG. 7 shows an input pulse whose length is less than four full clock cycles but more than two clock cycles. Since small variations in the frequency of the input pulses are acceptable, and hence variations in the pulse length, both FIGS. 5 and 7 are also interpreted as being normal width pulses. This interpretation would appear to allow for a large variation in a "normal" pulse, but close examination will prove that this is not the case.

Assume that a pulse of the maximum normal pulse length as shown in FIG. 5 appeared repeatedly on the data input of the shift register. FIG. 5 indicates that the signal would be interpreted as a normal length pulse. But further assume that the shifting described by FIG. 14 occurred, then as shown in FIG. 4, the pulse would be interpreted correctly as a long pulse. The same relationship is apparent between FIGS. 7 and 8 for normal and short pulses.

Therefore, a normal length pulse can be defined as being less that six full clock cycles in length and greater than three clock cycles (see FIG. 7) in length. A long pulse is defined as less than seven full but more than five clock cycles. And a short pulse is defined as at least one clock cycle and less than two full clock cycles.

The apparatus of FIG. 3 is included in the block 12 for positive signals in FIG. 1 and in block 16 for negative signals. The block 12 of FIG. 1 thus detects logic "1's" present in the tip return-to-zero data and the block 16 detects logic "1's" present in the ring return-to-zero data. These signals are combined and applied to the sequencer 20. The sequence followed in transversing the states of FIG. 10 is determined in accordance with a plurality of inputs. As shown in FIG. 1, this plurality of inputs includes the occurrence of data center pulses and clock signals.

If a normal data center is received at a time outside a prescribed range, the resynchronization block 22 starts adjusting the sequencer output to a value such that clock cycle C8 as shown in FIG. 4, which is the decoding point, falls substantially in the center of the continuously received but flip-flop time delayed normal length data pulses.

Normally the resynchronization circuit 22 is used only for power-up synchronization and noise filtering, since the sequencer itself can dynamically adjust for slow alterations in the incoming data signal, and can hold the clock at a stable value over a long period of time without the occurrence of any logic "1" or logic "0" signals being received.

In referring to FIG. 10, it will be noted that there are thirteen states listed. These states are the values of the Q outputs of JK flip-flops A through D in FIG. 13, generally indicated as 20. Every 80.958 nanoseconds, the state of the sequencer changes since it is clocked by the clock shown input as lead 18 in FIG. 1. The exit path from a given state is controlled by input signals received by the sequencer during that state. For example, if any data center is input to the sequencer in S8, then it will branch to S1 as shown by the line, otherwise it will branch to S9 at the beginning of the next clock cycle. Similarly, in S9 if a data center is received during that state it will branch to S1. However, if no data center is received, and a normal length data center was received at a time other than that of S1 through S6 in the previous cycle, the device will branch to state S11. If neither of the other two signal conditions occurred, it will branch to S10.

As will be realized from the discussion, the two main paths through the state sequence unit 20 are (1) states S8, S1, S2, S3, S4, S5, S6, S7 and return to the sequence starting with S8 and (2) states S11, S12, S5, S6, S7, S8, S9, S10 and return to S11. The first sequence is for the times when a data center is received during the times S7 through S9, and the other is when no normal length data center is received during the times S7 through S9. In both instances, an output clock will be generated starting 2 clocks before state S5 or in other words, if no data center is received, the clock will start at state S11 and if a data center is received, the clock will start at state S3. It will be noted that the leftmost bit in each case is a logic "1", and this is decoded from the output of the A flip-flop in FIG. 13, and output as the retimed clock signal on lead 46.

It may be assumed that the second sequence just occurred. It may be further assumed that no data center occurs in the next sequence during S8. It may be further assumed for the discussion that there are no clock offsets and there is no phase jitter on the input data. The absence of a data center in state S8 indicates the presence of a logic "0" input. This path provides a clock output starting in state S11 and ending in S6 which allows for the clocking of a logic "0" into a circuit that is connected to the clock recovery circuit. As long as no data centers are received after the S8 time period, the sequencer 20 will continue in this path indefinitely.

When a data center occurs, it occurs at a maximum rate of 1.544 MHz for the application being referenced. The data center typically or nominally lasts 80.97 nanoseconds in one application of the inventive concept. The data center is synchronous with the transition from state to state in the sequencer 20 and in normal operation it occurs during state S8. When the data center is detected in state S8, the following occurs:

| State | Notation |
| --- | --- |
| S8 | the data center is detected so it branches to state S1. |
| S1 | the pulse center either negative or positive, which caused the data center to be detected is latched to the appropriate output. |
| S2 | the data output is maintained. |
| S3 | the clock is driven to a logic "1" while the data level is maintained. |
| S4 | the data and clock levels are maintained. |
| S5 | the clock is maintained while the data is driven to a logic "0", whether it be a positive or negative data center. |
| S6 | the clock and data levels are maintained |
| S7 | the clock is driven to a logic "0" while the data level is maintained. |
| S8 | in normal operation, if another logic "1" is present in the input data, the data center will occur here and the sequence repeats. |

Looking at the notations adjacent each of the state indicators, it will be noted that the values given for the P and N formulas, which indicate positive and negative pulses, show the logic level as being set in state S1 and maintained at the previous value through S4. The values given for the clock signal CK are maintained at logic "0" until S3, at which time it follows whatever the logic level is of the leftmost digit in the sequencer or, in other words, flip-flop A of FIG. 13. These notations then adjacent the state sequence follow the description of operation just provided.

There are at least two conditions which cause the incoming data frequency to accumulate phase offsets: input frequency offsets, and input phase jitter. Although phase jitter produces phase accumulation offsets, over a long period of time it has an average zero value. The two sources of phase deviation may be additive and are treated as one source of jitter in this presentation.

As will be noted, each of the states S6, S8, S9 and S10 have an exit path to S1. If the frequency of the clock divided by 8, or whatever the sampling rate might be, is not equal to the frequency of the data pulse, there will be a change in the zero phase point. If the clock divided by the number of samples is a value greater than the average nominal data frequency, the phase of the center of state S8 will slowly shift with respect to the center of the data pulse. If the data pulse shifts to the right in FIG. 6, the data center will eventually be detected in S9. If the normal pulse is detected then, the path from state S9 to State S1 is followed and in effect has divided the clock by 9 rather than the normal 8. This will shift the center of the data pulse back to the S8 condition on the next cycle. On the other hand, if the center of the data pulse shifts to the left in FIG. 6, eventually the center of the data pulse will be decoded in S7. The iteration in this case goes directly from S7 to S1 and, in effect, the signal is divided by 7 and the center of the data pulse again coincides with S8.

From the above it appears that there is an overlap of detection between "normal" and "long" pulses. However, the relative timing between the commencement of a data pulse and the next clock cycle does uniquely define the pulse length within the circuitry.

An explanation of the paths from S10 to S1 and S6 to S1 has not been given so that a final complication can be discussed. The incoming signal is allowed to contain as many as 15 time intervals where no data (or zero data) is transmitted. During this amount of time, it is highly probable that phase jitter, which can accumulate although no data is transmitted, would cause the time of occurrence of the signal data center to drift from state 8 of FIG. 10 through state 9 and finally into state 10 before a data pulse was received. If a branch between S10 and S1 was not provided, a data error (incorrectly interpreted data) would occur. Similarly, the signal data center could drift from state S8 through S7 and into S6 necessitating a branch from S6 to S1.

For the purpose of the claims and specification, the definition of this device is a nonlinear digital phase-locked loop having discrete phase c adjustment steps of $2\pi/8$ radians.

The resynchronization circuit 22 of FIG. 1 performs the two functions of noise filtering and synchronization for power-up or after a loss of signal. Upon initial start-up, the data center can occur at any state of the sequencer 20. The objective of the resynchronization circuit 22 is to force state S8 to occur simultaneously with the data center signal. If the data center is found to occur in S1, S2, S3, S11 or S13 the path taken is through S9, S10 and S13 back to S11 to advance the phase of the output clock. On the other hand, if the data center if found to occur in S4, S5 or S12, the path taken is from S8 and S9 directly to S11 to "lag" the phase of the output clock.

As designed, the resynchronization circuit 22 will only make one adjustment per *normal* data center. In other words, any pulses other than a normal pulse could be noise, and thus are ignored during the resynchronization process. This, in effect, filters the noise pulses since only normal length pulses can cause the resynchronization action.

The circuit diagram illustrated in FIGS. 12 and 13 presents a specific embodiment for ring and tip signals used in a telephone line having return-to-zero input and output. Since the design is reasonably straightforward, it is believed that further explanation of the specific circuit used is unnecessary. Further, it will be realized by those skilled in the art that other sampling rates could be used to obtain more accuracy, or in other words, smaller steps in the adjustment of the phase-locked loop.

We thus wish to be limited only by the scope of the appended claims, which claim a clock recovery circuit using decoding techniques to ascertain the length and position in time of the incoming pulse both for noise pulse discrimination, and to more accurately time the output clock with respect to the incoming data under situations of extreme data distortion or noise. Thus,

We claim:

1. Apparatus for detecting the data center of incoming bipolar return to zero data comprising, in combination:

input signal first means for supplying data signals at no more than a maximum rate N;

slicer second means including first and second output means, connected to said first means for receiving data therefrom, for detecting whether incoming signal polarity is positive or negative and supplying a given logic level signal to said first output means whenever the incoming signal exceeds a positive threshold signal level and supplying said given logic level signal to said second output means whenever the incoming signal exceeds a negative threshold signal level;

clock third means for supplying a clock signal having a repetition rate of at least 8N;

positive signal delay fourth means, including signal input means connected to said second and third means for storing samples at the clock signal repetition rate of signals received from said second means, having multiple tap output means for providing incrementally delayed versions of the signal samples;

negative signal delay fifth means, including signal input means connected to said second and third means for storing samples at the clock signal repetition rate of signals received from said second means, having multiple tap output means for providing incrementally delayed versions of the signal samples;

positive data center logic sixth means, connected to said multiple tap output means of said fourth means, for detecting signal levels at said tap output means and for providing output short first, normal second or long third signals in accordance with the detection of two, three or at least four tap output means being at a given logic level;

negative data center logic seventh means, connected to said multiple tap output means of said fourth means, for detecting signal levels at said tap output means and for providing output short first, normal second or long third signals in accordance with the detection of two, three or at least four tap output means being at predetermined given logic levels; and further logic eighth means, connected to said third, sixth and seventh means for receiving said first, second and third output signals from each of said sixth and seventh means, for supplying output first through fourth signals indicative respectively of whether a data center was detected as having occurred at any given clock time, whether it was a normal length data center and whether it was a positive data center or it was a negative data center.

2. Data center detection apparatus comprising, in combination:

signal input first means for supplying bipolar return to zero signals occurring at no more than a maximum nominal rate N;

clock signal second means having a clock signal rate of at least 8N;

signal sample and storage third means, connected to said first and second means for receiving data and clock signals therefrom, for sampling the amplitude of signals supplied at the clock rate and storing a given logic value whenever the signals sampled exceed a predetermined threshold; and logic fourth means, connected to said second and third means, for correlating, at given clock times, the logic value of signals stored by said third means and providing output signals indicative of (1) whether the signal sampled had a duration of at least two clock signals and therefore was a valid data center, (2) whether the signal sampled had a duration of more than a first number of clock signals and less than a second number of clock signals and therefore was a normal data center, and (3) and (4) whether the signal sampled was a positive data center or a negative data center.

3. Data generation apparatus comprising, in combination:

signal supplying first means for supplying five signals indicative respectively of (1) the occurrence of a data pulse, (2) whether the pulse was of a predetermined duration, (3) a high speed clock signal having a much higher repetition rate the the data pulses, and (4) and (5) whether the generated pulse is to be positive or negative;

intelligent counter second means, connected to said first means for receiving the five signals therefrom;

logic third means, coaprising part of said second means, for outputting a signal to cause said second means to follow a phase adjusting first set of count sequences if the occurrence of a data pulse is received during a given period of time in the count sequence, the count sequence operating to divide the clock third signal by N for use in generating the time of occurrence of an output data pulse and output clock signal;

logic fourth means, comprising a further part of said second means, for outputting a signal to cause said second means to follow a resynchronization second set of count sequences if the occurrence of a data pulse is received at a time other than during the given period of time in the count sequence;

logic fifth means, comprising part of said third means, for adjusting the first set of count sequences to count by a greater (N+M) or lesser (N−M) number of counts depending directly upon whether a data pulse is received later than or earlier than it should be for a predetermined duration normal pulse;

logic sixth means, comprising part of said fourth means, for outputting clock signals only on a divide by N basis of the input clock third signal when the first signal signifying the receipt of a data pulse is not received by said logic sixth means during a count sequence;

logic seventh means, comprising a further part of said fourth means, for dividing the incoming clock third signal by (N+M) or (N−M) in accordance with when the incoming first signal was received outside the given period of tiae; and decoding logic eighth means, connected to said second means for receiving the count output therefrom and connected to said first means for receiving the fourth and fifth input signals therefrom, for providing as output signals a clock signal and data signals of a polarity in accordance with said input signals, the clock signal always commencing a predetermined time after commencement of any data signals.

4. The method of recovering a clock signal from bipolar return to zero data comprising the steps of:

passing only received signals that exceed predetermined threshold values as first signals;

sampling said first signals at a rate much higher than the rate of occurrence of data signals;

storing the results of the samplings as a plurality of binary level second signals;

detecting the number of stored second signals having a given logic level at each sample time and generating third signals indicating the fact that data signals were received, generating fourth signals indicating the polarity of the received data signal, and generating fifth signals indicating whether or not the duration of the data signal received was normal;

sequencing through one of main and resynchronization sets of counts depending upon whether or not said third signal was generated, either sequence operating to divide a high frequency clock used in sampling the first signals to provide an output clock signal occurring at nominally 1/N the sampling rate;

periodically altering the 1/N divide ratio when a normal data pulse is detected in the first signal which data pulse occurs at other than a predetermined time in the main sequence for returning the sequencing toward a synchronous basis; and generating output data signals, at a time and of a polarity determined in accordance with a logical combination of the count in said main sequence and said fourth signals.

5. Apparatus for recovering a clock signal from bipolar return to zero data comprising, in combination:

amplitude detector first means for passing only received signals that exceed predetermined threshold values as first signals;

second means, connected to said first means, for sampling said first signals at a rate much higher than the rate of occurrence of data signals;

third means, comprising part of said second means, for storing the results of the samplings as a plurality of binary level second signals;

fourth means, connected to said second and third means for detecting the number of stored second signals having a given logic level at each sample time and generating third signals indicating the fact that data signals were received, generating fourth signals indicating the polarity of the received data signal, and generating fifth signals indicating whether or not the duration of the data signal received was normal;

fifth means, connected to said fourth means for receiving signals therefrom, for sequencing through one of main and resynchronization sets of counts depending upon whether or not said third signal was generated, either sequence operating to divide a high frequency clock used in sampling the first signals to provide an output clock signal occurring at nominally 1/N the sampling rate;

sixth means, comprising part of said fifth means, for periodically altering the 1/N divide ratio when a normal data pulse is detected in the first signal which data pulse occurs at other than a predetermined time in the main sequence for returning the sequencing toward a synchronous basis; and seventh means, connected to said fifth means, for generating output data signals, at a time and of a polarity determined in accordance with a logical combination of the count in said main sequence and said fourth signals.

* * * * *